United States Patent [19]
Paoluccio

[11] Patent Number: 5,902,362
[45] Date of Patent: May 11, 1999

[54] EXPANSION COALESCING SILENCER FILTER SYSTEM

[76] Inventor: John A. Paoluccio, P.O. Box 1316, 5038 Salida Blvd., Modesto, Calif. 95368

[21] Appl. No.: 08/749,990

[22] Filed: Nov. 15, 1996

[51] Int. Cl.⁶ .................................................. B01D 29/90
[52] U.S. Cl. .............................................. 55/418; 55/467
[58] Field of Search ............................. 55/418, 420, 467, 55/469; 417/472

[56] References Cited

U.S. PATENT DOCUMENTS

| | | | |
|---|---|---|---|
| 842,661 | 1/1907 | Hein | 55/469 |
| 862,266 | 8/1907 | Mestitz | 55/469 |
| 4,087,214 | 5/1978 | Kushner et al. | 417/557 |
| 5,402,803 | 4/1995 | Takagi | 55/210 |

FOREIGN PATENT DOCUMENTS

| | | | |
|---|---|---|---|
| 655895 | 1/1938 | Germany | 55/269 |
| 25518 | 11/1905 | United Kingdom | 55/469 |

Primary Examiner—Jay H. Woo
Assistant Examiner—Robert Hopkins
Attorney, Agent, or Firm—Robert S. Smith

[57] ABSTRACT

A system for treating a quantity of fluid from an associated fluid source which includes a variable volume device having an interior space, fluid communication apparatus connecting the interior space of the variable volume device to the associated fluid source, a treatment assembly communicating with an outlet of the variable volume device and apparatus biasing the variable volume device to have a smaller volume whereby the fluid is urged out of the variable volume device into the treatment assembly. In some cases the treatment assembly is a filter assembly which may include a coalescing filter. The apparatus biasing the variable volume device to have a smaller volume may be a weight on a part of the variable volume device. The system may further include apparatus biasing the variable volume device to slow the rate of increase in volume as the variable volume device approaches maximum volume. Some forms of the filter assembly may include a container and the level of oil in the container may be visible through the walls of the container.

7 Claims, 6 Drawing Sheets

EXPANSION COALESCING SILENCER FILTER SYSTEM

BACKGROUND OF THE INVENTION

As noted above the invention relates to apparatus for protecting the environment from contamination. Although the preferred embodiment is directed to removal of oil from air exhausted from pneumatic devices it will be understood that the invention includes and has application to all forms of treatment processes directed to a fluid that is periodically or intermittently discharged, or is discharged at a varying rate. In each of these situations the system designer would traditionally design a system sized to treat continuously the maximum anticipated effluent flow rate. The present invention is capable of, in effect, storing the effluent and treating the effluent at a relatively low flow rate. Accordingly, the treating apparatus may be much smaller in capacity than apparatus that is sized to accommodate the maximum flow rate. The invention thus presents an opportunity to provide treatment apparatus that is much smaller than that apparatus that would be required in the case of apparatus designed for peak load conditions.

Although the invention has particular application to preventing industrial contamination of the atmosphere and particularly for protecting environment by (1) preventing the discharge of oil that would otherwise be present in the exhaust air discharged by industrial valves, cylinders and air motors and (2) limiting the noise pollution created by this same class of equipment incident to the noisy discharge of air those skilled in the art will recognize a wide variety of other applications. For example, the treatment of almost all fluids that are produced at a varying or cyclical rate may be facilitated by the apparatus of the present invention. This apparatus may be employed to temporarily store a fluid and then slowly discharge that fluid to a treating apparatus. Although the preferred embodiment of the invention includes a coalescing filter, it will be understood that some embodiments need not include a coalescing filter although most will include some filter or analogous structure.

Compressed air systems are used to provide compressed air to operate valves, cylinders, air motors and other devices. The compressed air may be supplied at 100 psi pressure and may be reduced to 20 psi or some other pressure. The compressed air is used as a controlled energy source and may enter a device and cause the device to do work such as open a valve, move a cylinder, close a damper, or cause other device operations. The compressed air stored in the operating portion of the device is expelled as it completes its expansion and work cycle. The air may be exhausted at some low pressure that may be 1 to 5 psi or some other pressure, The air quickly drops to ambient pressure as it enters the ambient air. This sudden drop in air pressure is accompanied by a very high level of noise generation. The frequency of this operation may occur several times a minute, several thousand times a day or any frequency required of the operation or device. The system may contain one or hundreds of these devices. The compressed air may fill the operator portion of the device in a small fraction of a second. The device may take 20 seconds between cycles. The end of the cycle results in the exhaust of this lower pressure compressed air that may for example be 1 psi. It may take, for example, 0.1 second for the exhaust to exit the exhaust port of the device.

The compressed air used to operate these devices picks up oil, used as a lubricant in the devices, and then exits the exhaust ports in the form of an oil laden aerosol mist. This invention addresses a practical means of removing the oil that otherwise would enter the local ambient environment of the plant where it could cause health and safety related problems.

The present invention is an offshoot of the apparatus described in several other patents having the same inventor as the inventor of the present invention. U.S. Pat. No. 4,827,719 deals with hydraulic oil systems is entitled "Closed Hydraulic System With Drying Means". U.S. Pat. No. 4,616,620 deals with engines and has been entitled "Contamination Control Apparatus". The third deals with the straining of sediment and the adsorption of oil out of waste water and is covered with U.S. Pat. No. 4,555,201 entitled "Sediment Dike" and a related patent pending. These prior inventions all include a bellows, bladder or flexible container and a desiccant dryer, absorber, filter or waste containment portion. The first two convert open systems to closed systems. The present invention relies on this background and the background described in the other patents having the same inventor as the present application.

Up until fairly recently the compressed air that operated pneumatic devices was simply exhausted to the ambient. In recent years concerns for personnel safety has prompted the use of coalescing type filters to remove the oil aerosols from the exhaust air. This exhaust air quickly reaches near ambient pressure and the filters may be exposed to a variable instantaneously pressure that increases then decreases to ambient pressure. Numerous types of filters can be used for this purpose. Almost any filter will help capture the oil. In some cases the oil is captured and retained in a sump. All prior art systems have a fixed system volume between the exhaust port of the device and the outlet of the filter. This causes the exhaust air to very quickly flow through the filter media at high velocity.

All known prior art methods route the exhaust directly to and through a filter media. Since the exhaust exits the devices at a very rapid rate the air pressure rapidly increases and then decreases until the air flows through the filter media. Therefore, the filtration takes place in a very short period of time. For example, 0.2 SCF may be exhausted in 0.1 seconds. This equates to a nominal flow rate of 2 SCFS or 120 SCFM. The filter media surface area and pressure drop capacity must be able to deal with the instant maximum pressure differential across the filter media thereby resulting in a greater filter surface area being required due to the very short duration of filtration time. The filtration efficiency at the higher pressures is less than at low pressures. These prior art systems are considered fixed volume open systems. High operating and maintenance costs are the result. Because of the high cost their use is limited.

SUMMARY OF THE INVENTION

It is an object of this invention is to provide a practical means of treating the air exhausted from pneumatic valves, cylinders, air motors and other pneumatic devices.

It is also an object of the invention to provide apparatus that is adaptable to be installed on individual pneumatic devices as well as systems of many pneumatic devices.

Another object of the invention is to provide apparatus that will permit operation with a smaller filter media and will thus have a lower cost for the initial installation as well as a lower cost for maintenance throughout the life of the apparatus.

Still another object of this invention is to reduce the noise generated by the exhaust air.

It has now been found that these and other objects of the invention may be attained in a system for treating a quantity of fluid from an associated fluid source which includes a variable volume device having an interior space, fluid communication means connecting the interior space of the variable volume device to the associated fluid source, a treatment assembly communicating with an outlet of the variable volume device and means biasing the variable volume device to have a smaller volume whereby the fluid is urged out of the variable volume device into the treatment assembly.

Some forms of the invention have a variable volume device having an interior space, a fluid communication means connecting the interior space of the variable volume device to the associated apparatus, a filter assembly communicating with an outlet of the variable volume device, and means biasing the variable volume device to have a smaller volume whereby the fluid is urged out of the variable volume device into the filter assembly.

The filter assembly may include a coalescing filter. The means biasing the variable volume device to have a smaller volume may be a weight on a part of the variable volume device. The system may further include means biasing the variable volume device to slow the rate of increase in volume as the variable volume device approaches maximum volume.

Some forms of the filter assembly may include a container and the level of oil in the container may be visible through the walls of the container. The variable volume device may be a bellows. The filter assembly may be disposed within the bellows and the coalescing filter may be elongated whereby contact time with the contaminated liquid is longer. Other forms of the invention may have a variable volume device that is chamber in a tank that is also occupied by a bladder.

It will be understood that the exhaust air contains oil from the air compressor 28 and the operating devices. Assume: One cycle consist of 0.2 cubic foot volume of air at Standard Air Conditions (SAC) and exits the exhaust port of the device in 0.1 second and drops in air pressure from 1 psi to ambient in a fraction of a second. Normally this air would enter the ambient air directly or pass through a filter assembly in the same time frame of 0.10 second because of the fixed volume. The flow rate would be 0.2/0.1=2 SCFS or 120 SCFM even though only 0.2 SCF would flow through the filter. However, with this invention, the 0.2 SCF of air is first captured by the bellows and retained. Then the air is allowed to flow at a very slow rate through the filter assembly. The bellows may take 5 seconds to deflate. The flow rate is now 0.2/5=0.04 SCFS or 2.4 SCFM. This is only $\frac{1}{50}^{th}$ of the flow rate of the prior art systems and a much smaller filter can be provided. Stated another way, the invention causes the filter to continue functioning for a time period that may be 50 time longer at a low flow rate.

This is a substantial improvement over the prior art. The bellows should be sized larger than the volume of the exhaust air for each cycle. The actual filter size with various safety factors may result in a filter that is $\frac{1}{10}$ or $\frac{1}{14}$ the present size requirement. This is still a substantial improvement over prior art.

The unique feature of this expansion coalescing filter in accordance with the present invention is the means employed to put to use the waste energy of the exhaust air. The weighted bellows, normally deflated, allows for the temporary capture of the almost instant release of the entire exhaust air volume. Then due to the configuration of the bellows it deflates at a slow pace while in fluid communication with the filter assembly. This allows for a much smaller filter assembly to work for a much longer period of time at a lower face velocity to provide for a higher degree of oil removal from the air. The noise problem is also significantly reduced due to the slow controlled flow rate.

The expansion coalescing filter in accordance with the present invention puts to use a portion of the waste energy of the exhaust air by converting the air pressure drop to potential energy in the form of a specific volume of stored air at low pressure within a bellows having a weight to bias the bellows to the collapsed position. The air pressure and flow of the exhaust causes the bellows to inflate, in essence lifting the weight is while storing air. This occurs with each exhaust cycle from a pneumatic device such as a valve or cylinder. The weight of the bellows causes it to start to deflate as soon as the exhaust air pressure is less at the bottom of the bellows. The captured exhaust air flows from the bellows to the filter assembly. Their, the oil in the exhaust air is coalesced and removed from the air. The drained oil is captured in a sump or container and stored or absorbed with an absorbent media.

BRIEF DESCRIPTION OF THE DRAWING

The invention will be better understood by reference to the drawing in which.

The bellows is shown in the "down" or minimum position. A dashed outline shows the shape as it fills with air.

Figure 2A:
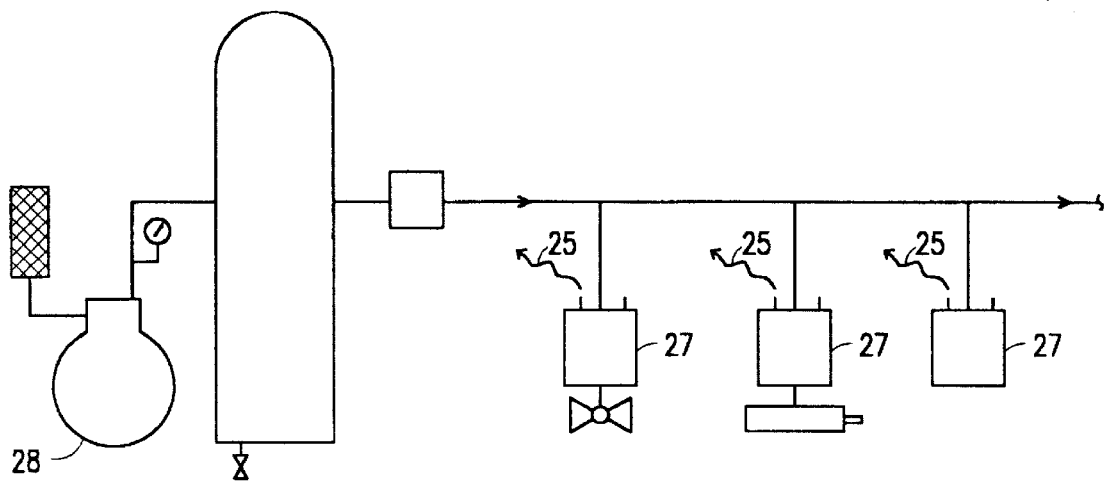

FIG. 2A shows a schematic diagram of a conventional prior art compressed air system. A compressor is shown serving several air operated devices. The exhaust from these devices contain oil mist and pollutes to ambient air.

Figure 2C:
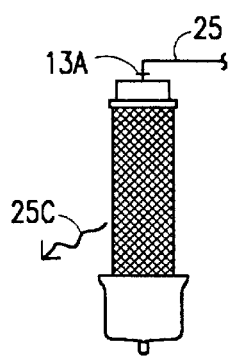
Figure 2B:
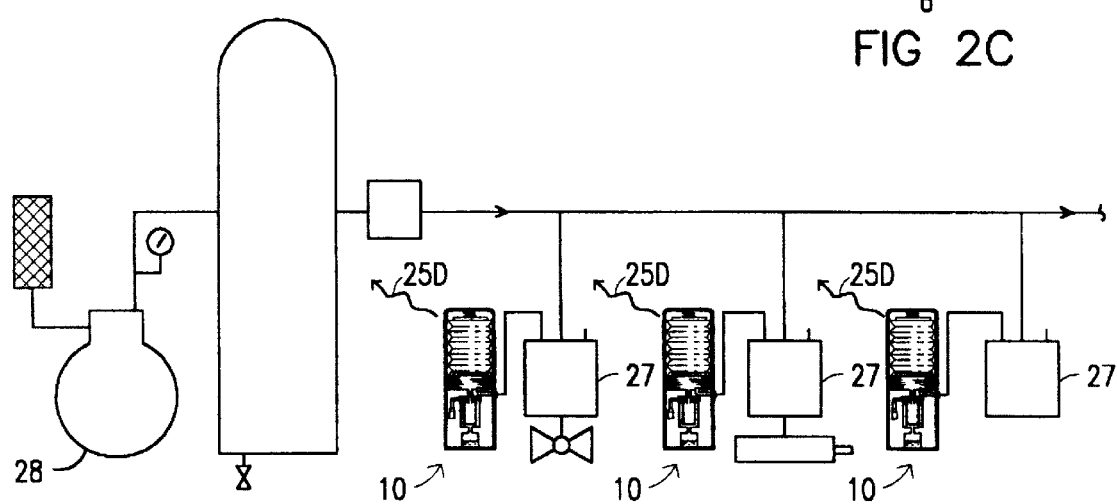

FIG. 2B shows the conventional system with exhaust air filters added to the devices. These act to remove the oil from the exhaust air but must be large enough to satisfy the maximum flow rate and pressure of the exhaust.

FIG. 2C is an elevational view of a coalescing filter and some of the connections thereto.

Figure 3A:
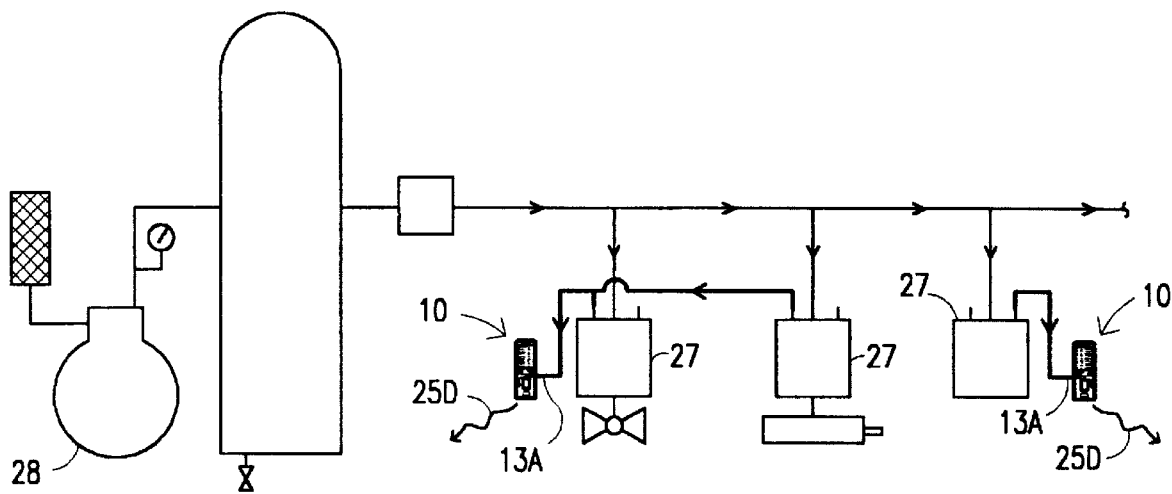

FIG. 3A shows a compressed air system with the expansion coalescing silencer filter invention units installed on the devices.

Figure 3B:
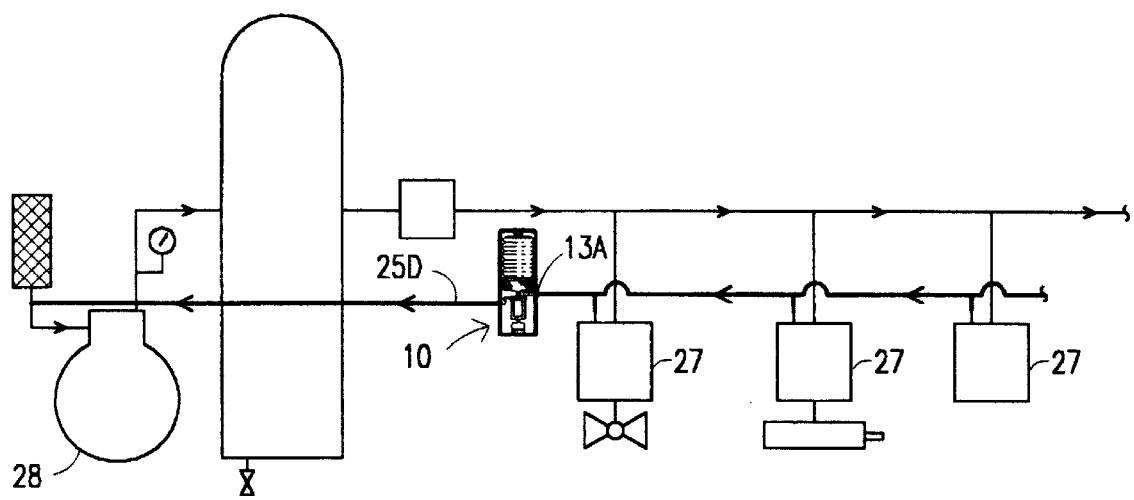

FIG. 3B shows a "Closed" compressed air system with the expansion coalescing silencer filter serving all the devices in the system. The cleaned exhausted air is reclaimed in the expansion coalescing silencer filter unit and returned to the inlet of the air compressor. This converts the "open" system to a "closed" system.

Figures 4A, 4B, 4C:
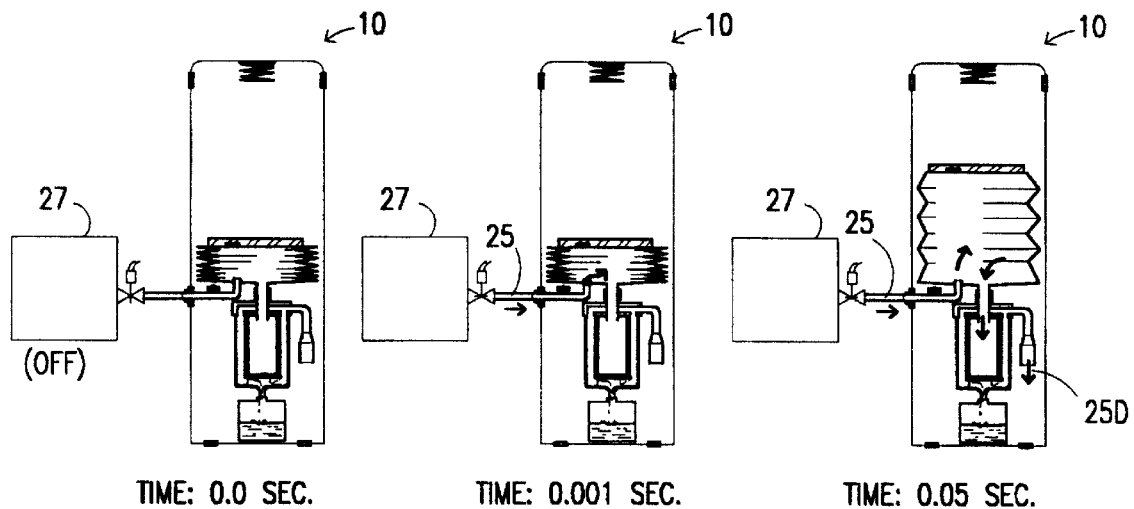

FIG. 4A through 4F collectively show the steps in one entire exhaust cycle of operation for a typical application. All times, flow rates, pressures etc. are meant to show the general approximate relationship only. More particularly:

FIG. 4A—Step #1: All items "off". This shows the bellows in the "down" position. Time of cycle is 0.00.

FIG. 4B—Step #2: Exhaust port on device starts to open. The pressure starts to increase to 0.1 psi plus. Flow is just starting to occur. Time of cycle is 0.001 seconds.

FIG. 4C—Step #3: Exhaust cycle is halfway through the exhaust port phase. One half the exhaust air has entered the bellows Time is 0.05 seconds.

Figures 4D, 4E, 4F:
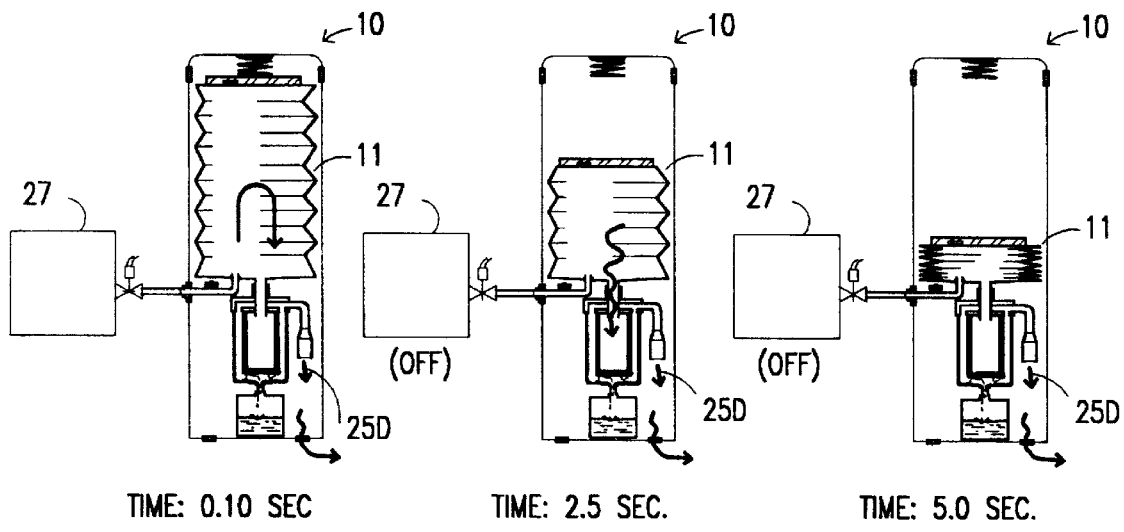

FIG. 4D—Step #4: The exhaust port is closed and all exhaust air has entered the bellows. As soon as the bellows reaches its maximum volume it starts to deflate due to the weight on top of the bellows. Time is 0.10 seconds. Note: This is the time frame when prior art systems complete the exhaust and filter phase, all in about 0.1 seconds!

FIG. 4E—Step #5: The bellows is now one half through its slow decent filtering mode. The weight on top of the bellows maintains a fairly steady 0.10 psi pressure to push the air through the filter assembly. The restricted ports of the filtering controls the rate of decent. Time is 2.5 seconds.

FIG. 4F—Step #6: The filtering mode is just complete. The bellows has dropped to the minimum position and all exhaust air has been expelled from the unit. Oil continues to drain into the sump by gravity. The bellows is now ready for another exhaust cycle. Time is 5.0 seconds.

Figure 5:
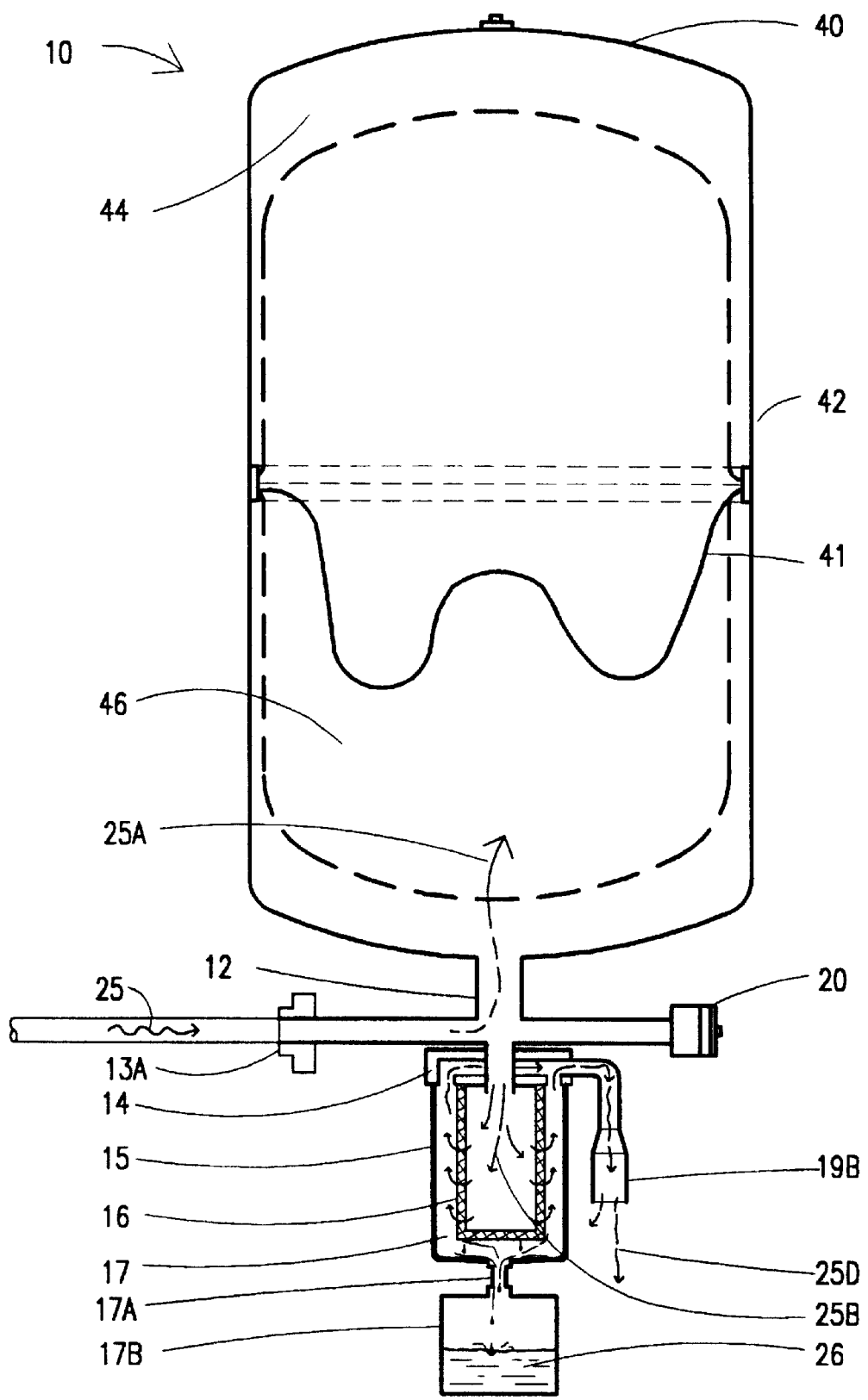

FIG. 5 shows another form of the invention with a bladder in a metal housing. A modified hydro-pneumatic tank could be used for this application.

Figure 6:
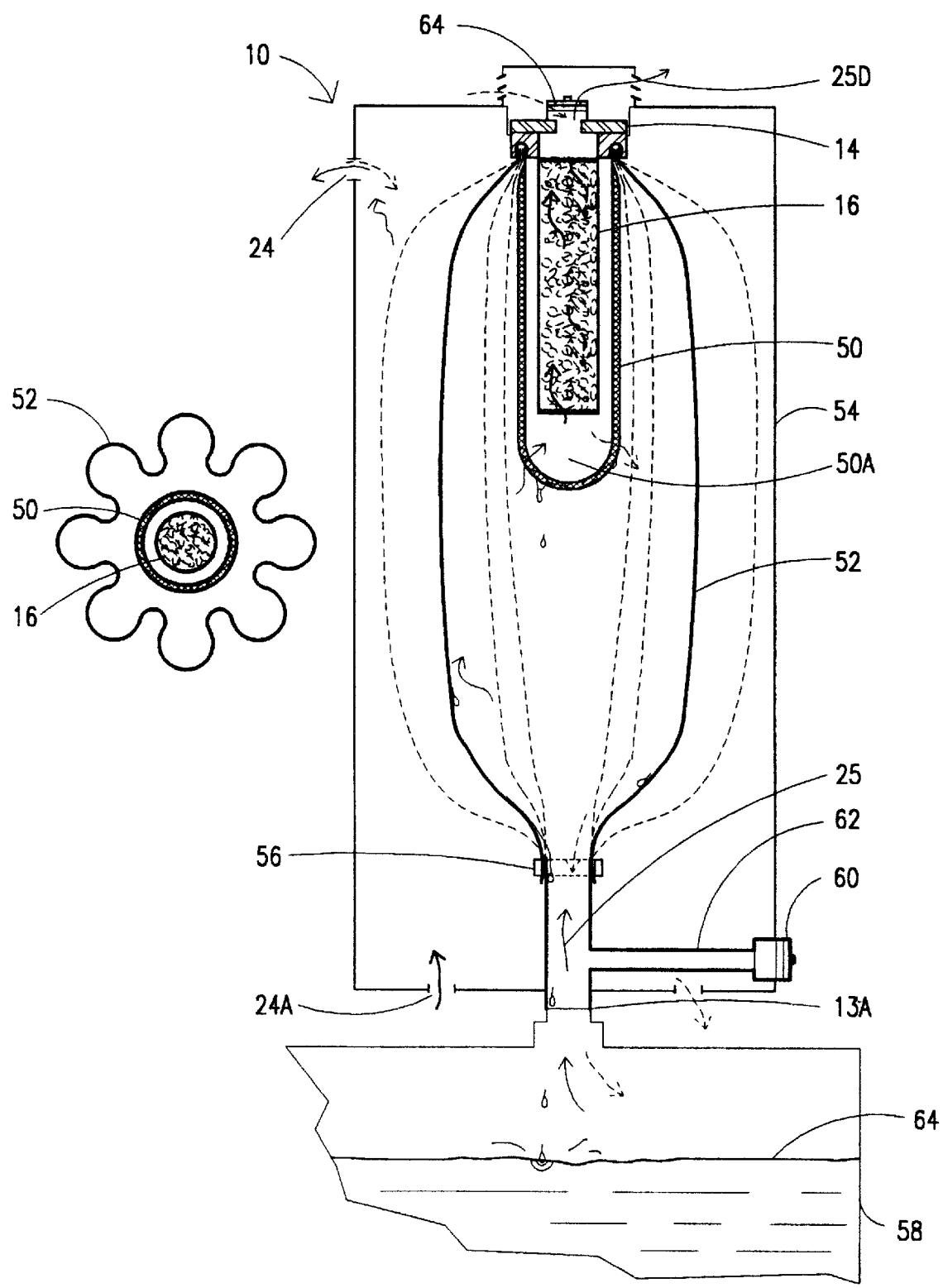

FIG. 6 shows another form of the invention for applications where a slight pressure can be maintained.

DESCRIPTION OF THE PREFERRED EMBODIMENTS

Although the preferred embodiment is directed to removal of oil from air exhausted from pneumatic devices it will be understood that the invention includes and has application to all forms of treatment processes directed to a fluid that is periodically or intermittently discharged, or is discharged at a varying rate. In each of these situations the system designer would traditionally design a system sized to treat continuously the maximum anticipated effluent flow rate. The present invention is capable of, in effect, storing the effluent and treating the effluent at a relatively low flow. Accordingly, the treating apparatus may be much smaller in capacity than apparatus that is sized to accommodate the maximum flow rate. The invention thus presents an opportunity to provide treatment apparatus that is much smaller than that apparatus that would be required in the case of apparatus designed for peak load conditions.

In a preferred form of the invention the exhaust air is quickly captured and retained, slowly treated, then exhausted. In another form of the invention the exhaust air is quickly captured and retained, slowly treated, then returned to the air compressor 28. These methods result in a clean and safe environment.

Referring now to FIGS. 1–4F the coalescing silencer filter system 10 in accordance with a preferred form of the invention includes a pipe or fluid communications means 13 that is coupled to a plurality of pneumatic cylinders 27 or other air exhausting devices. The combined exhaust air 25 from a plurality of pneumatic cylinders passes through the pipe 13, including a union 13A, to a bellows 11. The bellows 11 has having biasing means to urge the bellows 11 toward a collapsed position in which gases within the bellows 11 are forced out of the bellows. The biasing means may be a weight on top of a bellows, fluid pressure on top of a piston disposed in a cylinder, fluid pressure on a membrane in an accumulator, a spring exerting force on a piston or a spring acting against a plate pushing on a bellows 11.

In the preferred embodiment the apparatus further includes a fluid communication fitting 12 that allows fluid flow between the bellows 11 and a filter assembly 14. The filter assembly 14 includes a coalescing filter media 16 and a transparent or clear casing 15 that allows clean air to exit the top and the coalesced oil droplets to collect and drain out the bottom of the casing 15. The drained oil flows to a storage container 17B that may be a clear plastic bottle or container. The fluid communication fitting 12 may also connect to a safety pressure relief valve 20. The expansion coalescing silencer filter 10 unit can be located near a pneumatic cylinder 27 or other air exhausting device operated by an air compressor 28.

The illustrated apparatus also includes a sight glass 11C, an opening in the housing 21 to allow viewing of the indicator 22, an inlet port 13 at the bellows. Elements 12, 13 are preferably disconnected although they may be connected together. The end of element 13 is slightly raised above the bottom of the bellows to avoid oil leaking back to the device 27. A vent opening 24 at the housing 21 is also provided. Collected oil is identified by the reference numeral 26 in the clear storage container 17B. Reference numeral 14 identifies the filter assembly.

The following sequentially numbered paragraphs respectively describe the sequential steps in one operating cycle.

1. At the start of one cycle a large volume of exhaust 25 air exits the pneumatic device 27 in a very short period of time. For example, 0.2 SCF (standard cubic feet) in 0.1 seconds. This equates to 0.2/0.1=2 SCFS OR 120 SCFM. The exhaust 25 air pressure may be 1 psi near the point of discharge.

2. The 0.2 SCF of exhaust 25 air is routed to the expansion coalescing silencer filter 10 unit where the exhaust 25 enters a fluid communication fitting 12. One outlet of the fitting 12 connects to the underside of a weighted bellows 11. The bellows should be in the "down" or "minimum volume position" or deflated position 11A. The bellows 11 will always travel to the down 11A position because of gravity acting on the weight 11D on top of the bellows 11 or of its construction, and the fact that the other end of the fitting 12 is open, except for the restriction of the filter media 16 to ambient atmosphere.

3. The inlet port at the bottom of the bellows 11 is large and allows for the expanded area of the bellows 11 to be filled very quickly with the exhaust air 25A at a very low air pressure. Assume the bellows 11 has a full capacity of 0.6 SCF. This allows for all of the exhaust air 25A to be temporarily accumulated in the bellows 11. It may take several tenths of a second to inflate the bellows 11. If, for example, it takes 0.1 seconds to inflate the bellows the flow rate into the bellows 11 is 0.2/0.1=2 SCFS. This allows the 0.2 SCF of exhaust 11 air to expand into the bellows 11 and reach near ambient air pressure. The pressure may now be close to 0.1 psi.

4. Immediately during the bellows filling period a small portion of the air 25B enters the filter housing 14. However, the air pressure is now reduced to a mere fraction of the exhaust 25 air pressure of 1 psi. In fact it drops to approx. 0.1 psi which will be the same as the exhaust 25A air pressure within the bellows 11.

5. The exhaust 25 air passes in fluid communication between the bellows 11 and the filter assembly 14 at a relatively slow and uniform rate. This rate depends on the stiffness of the bellows 11 and the weight of the mass 11D on the top of the bellows 11. The bellows 11 structure is such that it effectively utilizes the waste pressure energy from the decreasing pressure of the exhaust 25 by converting this waste pressure energy into useful potential energy.

6. The oil 26 aerosol and mist is "coalesced", by the filter media 16, into larger droplets where gravity drops the oil 26 to the lower portion of the filter casing 15. The oil 26 droplets are then captured in the storage container 17B below the filter media 16.

7. The cleaned exhaust air 25C then exits the outlet port 19 of the filter assembly 14. This air 25D may enter the ambient space or be exhausted outside.

8. The expansion coalescing silencer filter 10 unit then stabilizes itself to a ready position with the weighted bellows 11 in the "down" 11A or fully deflated position, ready to start another cycle. The cycle is then repeated again and again.

9. Eventually, after a long period of time, the oil storage container 17B will become full of oil 26 and need to be emptied. 10. In another form of the invention, the coalescing filter media 16 and the absorber media 17 can be contained in a replaceable clear cartridge 15 cover. The absorber media may be an indicating desiccant such as a molecular sieve or alumina. These indicating desiccants change color from blue when they are dry to pink when they are wet. This allows for visual inspection as to the condition of the absorbent media 17. When saturated with oil, a color change can be seen through the clear cartridge 15 portion. This tells the operator that it is time to change out the cartridge 16. This could be practical for small units. The spent cartridge could be easily unscrewed and removed for disposal. A new cartridge could quickly be screwed into the assembly.

11. Should, for any reason, the pressure build up within the expansion coalescing silencer filter unit 10, a built in safety spring loaded pressure relief valve 20 will open and allow for the excess pressure to be safely relieved. The valve will then reseat to once again close and protect the unit.

12. During this entire exhaust cycle, the noise that would normally be generated by the rapid expansion of the exhaust air from the initial pressure, or for example 1 psi to 0 psi (ambient), would be eliminated. With this Expansion coalescing filter in accordance with the present invention 10 the exhaust 25 air is slowly diminished in velocity and pressure by the temporary storing of the potential energy in the bellows 11. With the slow release of the exhaust 25B air back through the filter media 16 and upon its release from the exit port 19B the generation of noise is reduced considerably.

It is noted with respect to step 5 above that the potential energy stored within the bellows 11 is the unique feature of this expansion coalescing silencing filter in accordance with the present invention that enables the stored energy to effectively provide for the extended time required of the driving force needed to push the dirty exhaust 25 air through the filter media 16. The slow descent of the bellows 11 may take over several seconds of time instead of the 0.1 second with the prior art fixed volume system. If, for example, the total 0.2 SCF exhaust 25 volume exits the bellows 11 and enters the filter assembly 14 in 5 seconds, the effective flow rate would be 0.2/5 which equals 0.04 SCFS. The 0.2 SCF of oil laden exhaust 25 air passes through the coalescing filter media 16 at this low flow rate for efficient filtration. The importance of this buffer type time extension puts the filter to work over an extended period instead of a very brief interval. In the example cited above the flow velocity through the filter media 16 is reduced by a factor of 50, from 120 SCFM to 2.4 SCFM. This reduced velocity can allow for much smaller area filters to be used and provides for higher filtration efficiency. This in turn reduces costs, increases use and protects our environment. The reduced flow velocity also reduces noise problems.

Although the invention has been described in terms of a bellows 11 those skilled in the art will recognize that other forms of the invention may use other variable volume devices. Such devices may include a bladder or even a cylinder and piston. The term "variable volume device" as used herein is generic to all such devices.

In addition to the preferred embodiment of the invention the invention also includes other variations:

1. In another form of the invention: The clear filter housing may be eliminated and the cleaned air merely enters the space and the oil drains into a sump.

2. In another form of the invention: The cleaned and filtered air may be routed back to the air compressor 28 for reuse. This approaches a closed system which results in the absolute minimum environmental pollution rate.

Although the invention has been described with reference to compressed air systems those skilled in the art will recognize that it has application to other systems, tools, tanks, drums or devices that have any form of intermittent gas venting. This temporary capturing of the waste pressure energy of the exhaust air, with a bellows or other variable volume device, then using this potential energy to provide for slow controlled flow, in the behalf of efficient filtration and/or gas absorption, can be used in many systems. These include pneumatic equipment and control, power transmission devices, tools, tanks, chemical purge venting, gas venting, flash or explosive forces, pressure release and emergency pressure relief valves, etc.

The filter system in accordance with the present invention has application with almost all fluids including air, gases, chemicals, radioactive gas and particle release, mixtures, and in certain cases, liquids. In those embodiments that include a coalescing filter element the size of expansion coalescing silencer filter units will vary with the application. They may be extremely small when used with individual control components or extremely large units for applications with a great number of exhaust devices. For example, a processing plant may have several hundred valves, cylinders, and air motors operating in a given industrial process. One large expansion coalescing silencer filter unit could receive the exhaust from each and operate as a buffer wherein the bellows is fluctuating in respponse to the combined net effect of the devices. The result would be cleaner ambient air and less noise at less cost.

The individual components that make up a expansion coalescing silencer filter unit may vary widely in materials of construction, shape, size, capacity and configuration as follows:

1. Bellows: The bellows may be made from a urethane coated nylon fabric, neoprene coated fabric, butyl, plastic or a lightweight stainless steel or other metal material. A bladder or accumulate of other shapes may also be used in certain applications. The use of a modified hydropneumatic tank could also be used for certain applications. A preformed bellows in the normally deflated position can also be used. (The term "performed" refers to the shape in which an object is formed and the shape the object will retain without the application of external forces. For example, to connect an automobile radiator you may use hose that is preformed with bends or a standard hose having no bends.)

2. Filter media: The fitter media may be made out of almost any of the great number of existing air and oil filter medias. One specific filter assembly that is advantageous to use due to its present design is the Finite Model ECS-2 Exhaust Coalescing Silencer. Another model is the Finite Model RGA-10G. This unit has a removable cartridge that can be connected to a sump bottle. The cartridge could also be modified with a fill absorber material for small systems.

3. Absorber media: This is an option to be used in lieu of or in addition to a sump and the absorber media may be practical to use for small systems and may be made from almost any of the present oil adsorbing materials commonly used for oil cleanup and spills. One material is Absorbent W and is a highly absorbent treated wood pulp. Another is X-Sorb which is an Aluminum Silica aggregate material. These absorbent medias may be treated with or include some other chemical or media. The media may contain activated charcoal, treated sawdust or paper or sponge, or any neutralizing or treating agent.

4. Filter media and cartridge casing: The Finite RGA-10G is a lightweight, clear plastic unit that can be modified to suit this purpose. However, it may be desirable to separate the filter media and the absorber media if used, in different cartridges as the coalescing filter media may never need changing. The absorber material may also contain activated carbon for removing certain hydrocarbon gases.

5. Pressure relief Valve: The pressure relief valve is for relieving any excess pressure buildup should it occur. Spring loaded relief valves can be used. A vacuum relief valve may also be used with certain applications. This may also include a filter and desiccant dryer.

6. Housing: The overall unit housing or enclosure can be made of almost any material as it is primarily for protecting the interior components. In one form of the invention the outer casing restrains the bladder as in a hydropneumatic tank. Lightweight plastic or metal material may be practical in most cases. Viewports, access doors and pressure gages may be provided. In some applications the bellows and filter assembly may be used without the housing.

7. Fluid communication fitting: This fitting may include specific orifice size openings between components in order to control the rate of flow from the bellows to the filter. In some cases manual balancing valves could be used.

Figure 1:
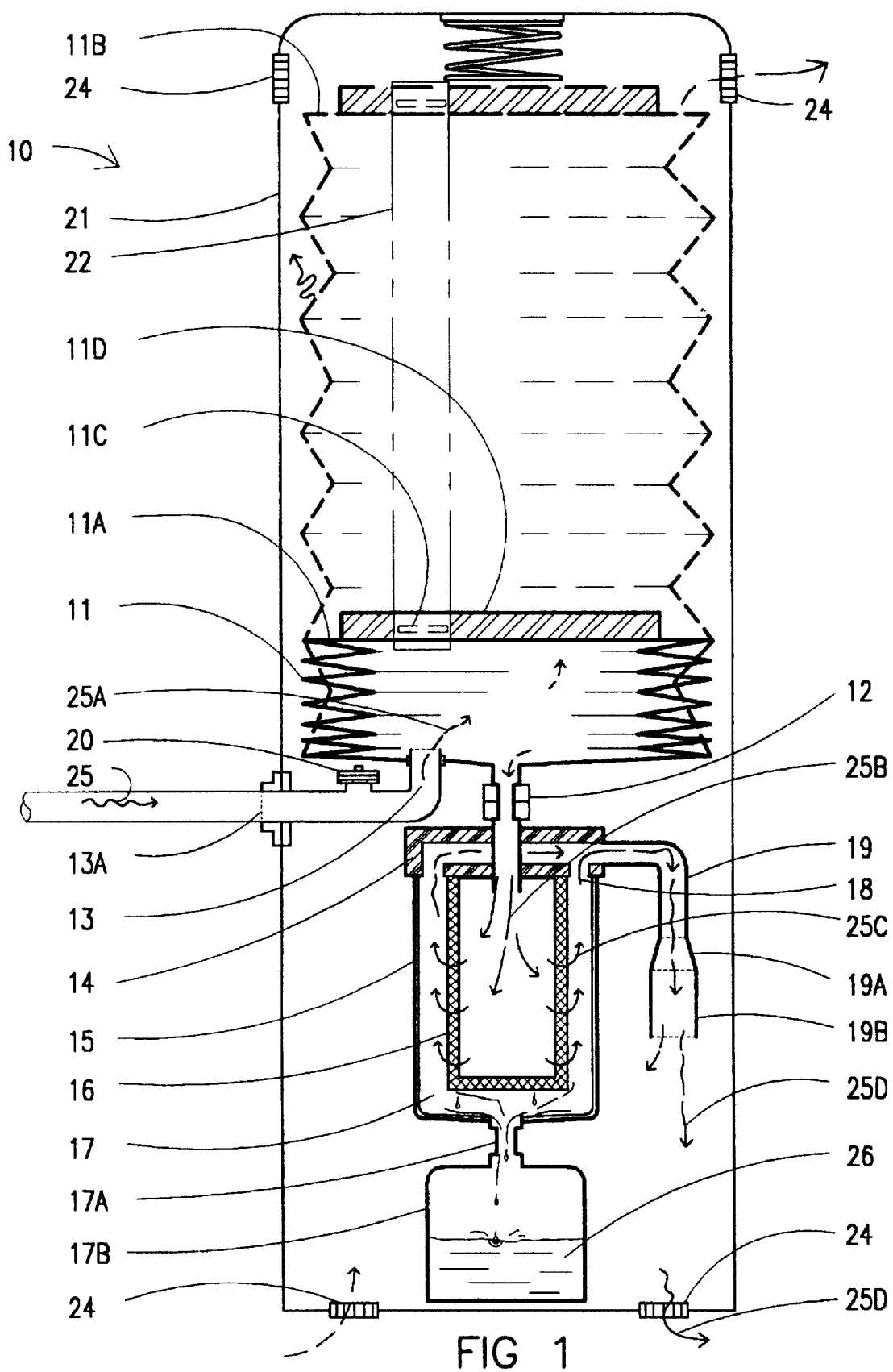
FIG. 1 shows a schematic cross sectional view of a preferred form of the invention.

Referring now to FIG. 5 there is shown another embodiment of the present invention is which the bellows 11, shown best in FIG. 1 is replaced by an accumulator 40 having a rigid housing 42. A flexible butyl bladder 41 is disposed within the interior of the rigid housing 42. Preferably, the bladder 41 will flex but never stretch even with changes of pressure inside the bladder 41 and inside the housing 42. Preferably the bladder 41 is dimensioned and configured to completely fill the interior of the rigid housing 42. The fluid to be decontaminated passes into the interior of the rigid housing 42. Because of the fixed quantity of air disposed within the bladder 41 the fluid to be decontaminated within the chamber 42 is biased for expulsion from the housing 42. In other respects the embodiment of FIG. 5 is similar to the embodiment of FIG. 1.

FIG. 6 illustrates still another embodiment of the invention in which an elongated coalescing filter 50 is disposed in substantially coaxial relation within an elongated bladder 52. The elongated bladder is disposed within a rigid generally cylindrical protective vented housing 54. An outlet pipe 56 communicates with the coalescing filter 50 and a reservoir 58 that receives the oil that is separated by the coalescing filter 50. An emergency pressure/vacuum release valve 60 is coupled to a pipe 62 that communicates with the outlet pipe 56. The emergency pressure/vacuum release valve 60 is ordinarily set for +/−2 psi. A pressure/vacuum relief valve 64 disposed at the top of the coalescing filter 64 is normally set at +/−0.6 psi or greater than the vapor pressure in the reservoir 58. Incoming contaminated fluid, such as air contaminated with oil, is treated by the coalescing filter 50. As shown schematically, the oil coalesces at the coalescing filter 50 and drips down through the outlet pipe 56 to the reservoir 58. The elongated bladder 52 receives the contaminated air above the surface 64 of the liquid in the reservoir. The balloon like tendency of the bladder 52 urges the contaminated air out in this embodiment.

This invention utilizes the waste potential energy in pressurized exhaust air, by means of a variable volume device, to effectively and efficiently control the flow rate and filtering rate of the exhaust air. This extends the filtration time and lowers the air velocity through the filter media. This apparatus provides a substantial improvement over prior art in that it enables the use of a much small filter media, reduces noise and insures high quality filtration.

The invention has been described with reference to its Illustrated preferred embodiment. Persons skilled in the art of such devices may upon exposure to the teachings herein, conceive other variations. Such variations are deemed to be encompassed by the disclosure, the invention being delimited only by the following claims.

I claim:

1. A filtration system for filtering a fluid passing out of associated apparatus which comprises:

a variable volume device having an interior space, an inlet, and an outlet;

fluid connection means coupled to the interior space of the variable volume device, said connection means being adapted for connection to the associated apparatus;

a filter assembly communicating with an outlet of said variable volume device, said filter assembly including means for extracting oil from said fluid; and means biasing said variable volume device to have a smaller volume whereby said fluid is urged out of said variable volume device into said filter assembly, said means for extracting oil from said fluid includes a coalescing filter, said means biasing said variable volume device to have a smaller volume is a weight on a part of said variable volume device.

2. A filtration system for filtering a fluid passing out of associated apparatus which comprises:

a variable volume device having an interior space, an inlet, and an outlet;

fluid connection means coupled to the interior space of the variable volume device, said connection means being adapted for connection to the associated apparatus;

a filter assembly communicating with an outlet of said variable volume device, said filter assembly including means for extracting oil from said fluid; and means biasing said variable volume device to have a smaller volume whereby said fluid is urged out of said variable volume device into said filter assembly, said means for extracting oil from said fluid includes a coalescing filter, said means biasing said variable volume device to have a smaller volume is a weight on a part of said variable volume device; and means biasing the variable volume device to slow the rate of increase in volume as the variable volume device approaches maximum volume.

3. The system as described in claim 2 wherein:

filter assembly includes a container and the level of oil in said container is visible through the walls of the container.

4. The system as described in claim 3 wherein:

said variable volume device is a bellows.

5. The system as described in claim 3 wherein:

said variable volume device is a chamber in a tank that is also occupied by a bladder.

6. A variable volume device having an interior space, an inlet, and an outlet;

fluid connection means coupled to the interior space of the variable volume device, said connection means being adapted for connection to the associated apparatus;

a filter assembly communicating with an outlet of said variable volume device, said filter assembly including means for extracting oil from said fluid; and means biasing said variable volume device to have a smaller volume whereby said fluid is urged out of said variable volume device into said filter assembly;

said means for extracting oil from said fluid includes a coalescing filter; and said variable volume device is a bladder and said filter assembly is disposed within said bladder.

7. The system as described in claim 6 wherein:

said filter is a coalescing filter and said filter is elongated.

* * * * *